United States Patent [19]

Jones et al.

[11] 4,271,675

[45] Jun. 9, 1981

[54] COMBUSTION APPARATUS FOR GAS TURBINE ENGINES

[75] Inventors: Bryn Jones, Belper; Sidney E. Slattery, Foston, both of England

[73] Assignee: Rolls-Royce Limited, London, England

[21] Appl. No.: 949,077

[22] Filed: Oct. 6, 1978

[30] Foreign Application Priority Data

Oct. 21, 1977 [GB] United Kingdom ............... 43910/77

[51] Int. Cl.³ .............................................. F02C 7/22
[52] U.S. Cl. ....................................... 60/737; 60/748; 60/39.36; 239/406
[58] Field of Search ................... 60/39.74 R, 39.74 B, 60/39.71, 39.36, 737, 748; 239/404, 405, 406

[56] References Cited

U.S. PATENT DOCUMENTS

| 1,536,046 | 5/1925 | Anthony | 239/406 |
|---|---|---|---|
| 2,531,027 | 11/1950 | Carroll | 239/404 |
| 2,607,193 | 8/1952 | Berggren et al. | 239/404 |
| 2,616,257 | 11/1952 | Mock | 60/39.74 R |
| 2,765,842 | 10/1956 | Lake | 239/404 |
| 3,134,229 | 5/1964 | Johnson | 60/39.74 R |
| 3,254,846 | 6/1966 | Schreter et al. | 239/406 |
| 3,946,552 | 3/1976 | Weinstein et al. | 239/406 |
| 4,044,553 | 8/1977 | Vaught | 239/405 |

FOREIGN PATENT DOCUMENTS 1096682 of 1961 Fed. Rep. of Germany .......... 60/39.36
45-37914 of 1970 Japan ....................................... 239/406

*Primary Examiner*—Robert E. Garrett
*Attorney, Agent, or Firm*—Cushman, Darby & Cushman

[57] ABSTRACT

Combustion apparatus for reducing objectionable exhaust emissions from gas turbine engines comprises a hollow conical member with an air inlet and fuel injector at its narrower end, the wider end being open into a combustion chamber, the wall of the conical member having a number of orifices for the throughflow of air, the orifices being directed tangentially into the interior of the conical member to impart a swirl to the mixture of fuel and air from the air inlet and fuel injector within the conical member.

13 Claims, 6 Drawing Figures

COMBUSTION APPARATUS FOR GAS TURBINE ENGINES

This invention relates to combustion apparatus for gas turbine engines and it is an object of the present invention to provide combustion apparatus which will produce reduced quantities of objectionable exhaust emissions from the engine such as nitrogen oxides, carbon monoxide and hydrocarbons.

Carbon monoxide and hydrocarbon emissions can be limited by careful control of the fuel/air mixture so that it is approaching substantially stoichiometric, in which case the exhaust products are basically carbon dioxide and water.

The formation of nitrogen oxides is dependent upon a number of factors, including the temperature of combustion (the higher the temperature, the greater the rate of combustion of the oxygen and nitrogen present in the gases) and the duration for which the gases are held at this temperature within the combustion chamber.

Nitrogen oxides can be reduced therefore by lowering the combustion temperature and ensuring efficient combustion, or reducing the residence time of the combustion products in the combustion chamber.

It has been proposed to reduce the combustion temperature by introducing more air into the primary combustion zone, recirculating cooled exhaust products or steam into the primary combustion zone or injecting water into the primary combustion zone, all these methods lowering the combustion temperatures. These methods however usually involve the addition of complex or heavy hardwear to the engine, such as variable geometry combustion chambers, blower, pumps or water storage tanks and suitable metering and injection equipment. Furthermore, such temperature reductions can increase the hydrocarbon and carbon monoxide emissions. It is an object of the present invention to reduce these emissions by careful control of the fuel/air mixture introduced to the combustion chamber and causing efficient burning thereof.

According to the present invention combustion apparatus for a gas turbine engine comprises a hollow conical member open at each end and having an air inlet and fuel injecting means adjacent the narrower end thereof, and a plurality of orifices formed in the wall of the conical member for the passage of air therethrough, the orifices being directed tangentially into the conical member to impart a swirl to a mixture within the conical member.

The orifices may be in the form of slots or holes.

Swirler means may be located adjacent to the narrower end of the conical member to create a swirl in the airflow before the fuel injection means.

The swirl created by the swirler means is preferably in the opposite direction to the swirl produced by the orifices.

There may be two sets of orifices each being adapted to create a swirl to the mixture within the conical member in an opposite direction to the other set of orifices.

The invention also comprises a gas turbine engine having combustion apparatus as set forth above.

Embodiments of the invention will now be described by way of example only with reference to the accompanying drawings in which.

Figure 1:
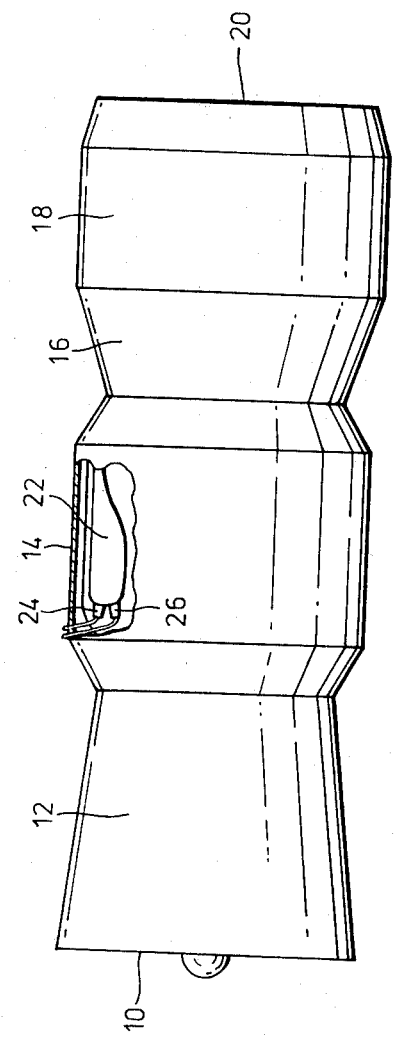
FIG. 1 is a schematic diagram of a gas turbine engine having combustion apparatus according to the invention.

The gas turbine engine illustrated in FIG. 1 comprises an air intake 10, compressor means 12, combustion apparatus 14, turbine means 16, a jet pipe 18 and an exhaust nozzle 20 arranged in flow series.

The combustion apparatus comprises an annular flame tube 22, at the upstream end of which are located two sets of burners 24 and 26 (FIGS. 1 and 6), each set being arranged circumferentially around the upstream wall of the flame tube 22.

Figure 2:
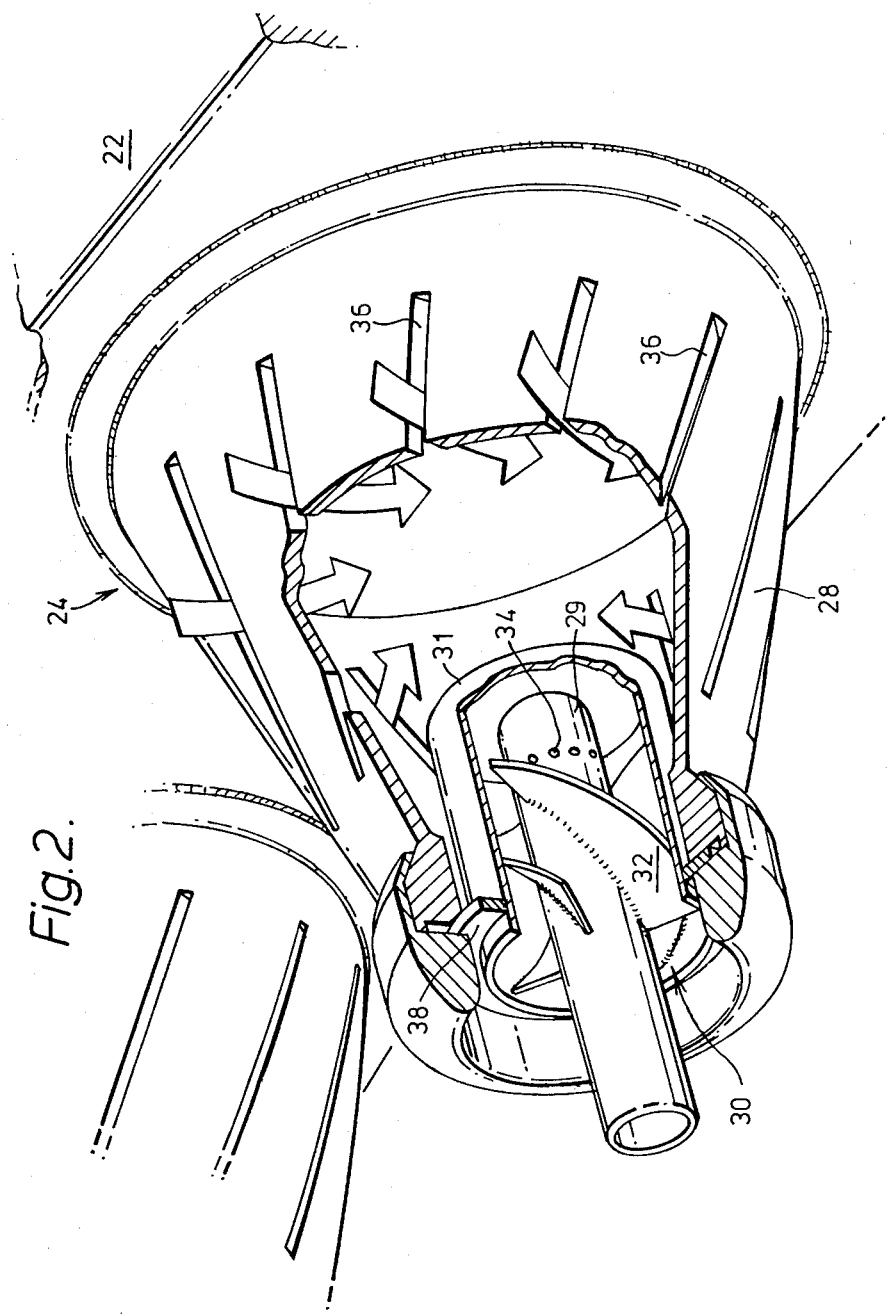
FIG. 2 is an enlarged perspective view of a fuel burner.

One of the burners 24 is illustrated in detail in FIG. 2 and consists of a conical body or member 28, the wider end of which opens into the flame tube 22, and a fuel injector 29 which is located at the upstream narrower end of the conical body 28, the fuel injector 29 being surrounded by a swirler 30 consisting of helical vanes 32 located between the fuel injector 29 and a sleeve 31. Radial holes 34 formed in the end of the injector 29 inject fuel radially outwards immediately downstream of the swirler vanes 32.

A plurality of slots 36 are arranged around the conical body 28 and these are adapted to admit air progressively into the conical body. These slots are arranged tangentially to the circular conical body so as to impart a degree of swirl to the mixture issuing from the upstream end of the conical body in the opposite direction to that of the swirler 30. The slots 36 promote mixing of the fuel and air, serve to keep the fuel off the internal surface of the conical body and impart a degree of swirl to the mixture issuing into the primary zone of the flame tube 22. The opposite rotation caused by the swirler vanes 32 and the slots 36 delays the spread of fuel sufficiently inside the conical body 28 to provide a fuel rich core flow in the centre of the conical body 28 which is intended to be too rich at high power conditions of the engine, but which provides a region of stable burning within the conical body 28 at very lean mixtures.

In order to achieve this core burning, the fuel injector 29 and the sleeve 31 protrudes within the interior of the conical body 28 to the extent of approximately half the diameter of the sleeve 31 in order to prevent the fuel injector airflow from attaching to the internal surface of the conical body 28. A sliding seal 38 is provided around the outside of the sleeve 31 in order to accomodate differential expansion of the flame tube 22 relative to the fuel injector 29.

The air jets passing through the slots 36 penetrate the interior of the conical body 28 and are exposed on all sides to fuel rich mixture. Any fuel which is deposited on the internal walls of the conical body 28 is reatomised from the edges of the slots 36.

The arrangement substantially eliminates fuel rich pockets of burning mixture which promote the formation of carbon monoxide at low power conditions of the engine and thus undesirable exhaust emissions are substantially removed under these operating conditions.

Figure 3:
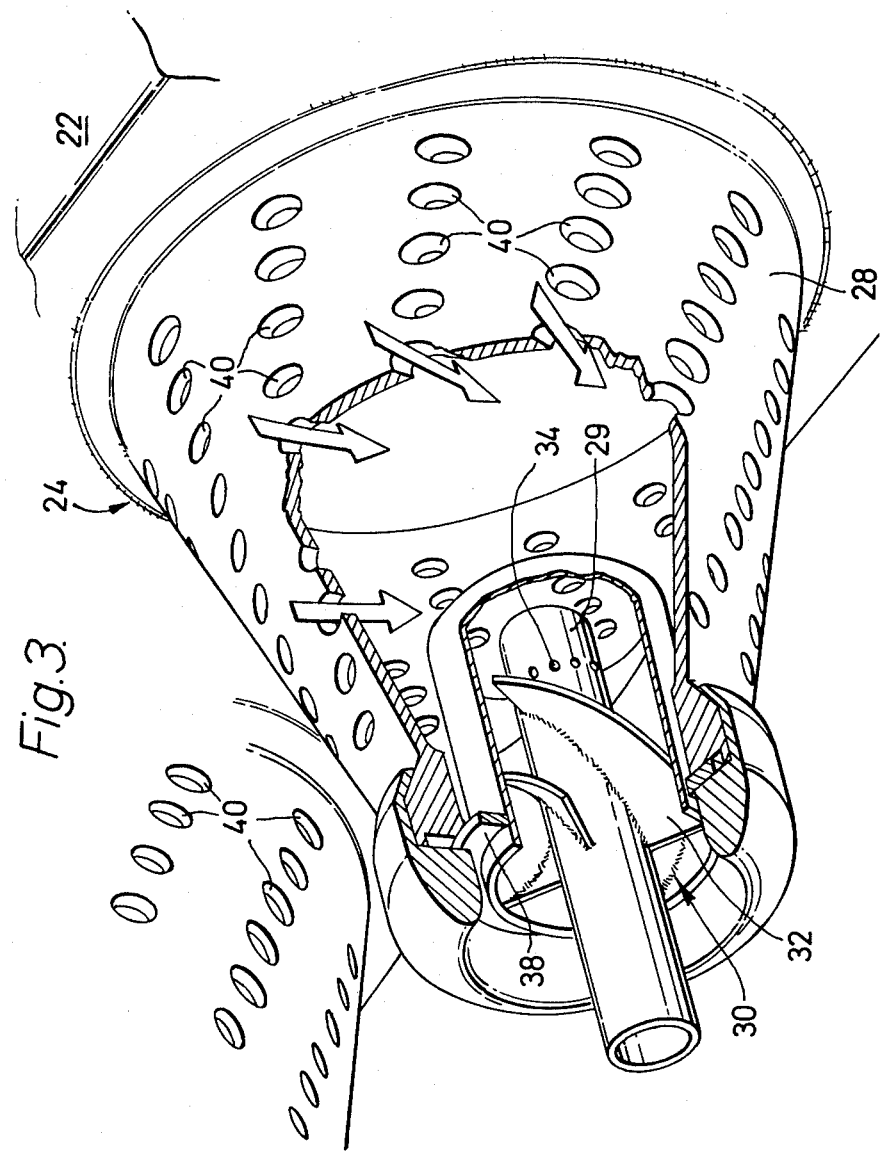
FIGS. 3 and 4 are enlarged perspective views of different embodiments of the fuel burner.

FIG. 3 shows an alternative embodiment of the burner 24 in which the slots 36 shown in FIG. 2 are replaced by circular holes 40. The air flowing through holes 40 promotes rapid mixing by virtue of the extended shear surfaces of the air jets created by the air flow through holes 40 which enter the conical member 28. The holes 40 are formed so as to impart a tangential component of velocity to the air jets entering the conical member 28 as before. The number of holes is optimised to provide the correct stoichiometry in the primary zone of the flame tube 22. Generally an angular pitch of between 18° and 30° provides satisfactory fuel dispersion. The diameter of the holes must be great enough to provide adequate jet penetration, typically 5% of the conical member outlet diameter. Since the air direction is controlled by the hole diameter and the thickness of the conical member, an excessive hole diameter would necessitate a thick heavy conical member, which would be undesirable in aircraft gas turbine applications.

The operation of this embodiment is the same as that of the embodiment shown in FIG. 2.

Figure 4:
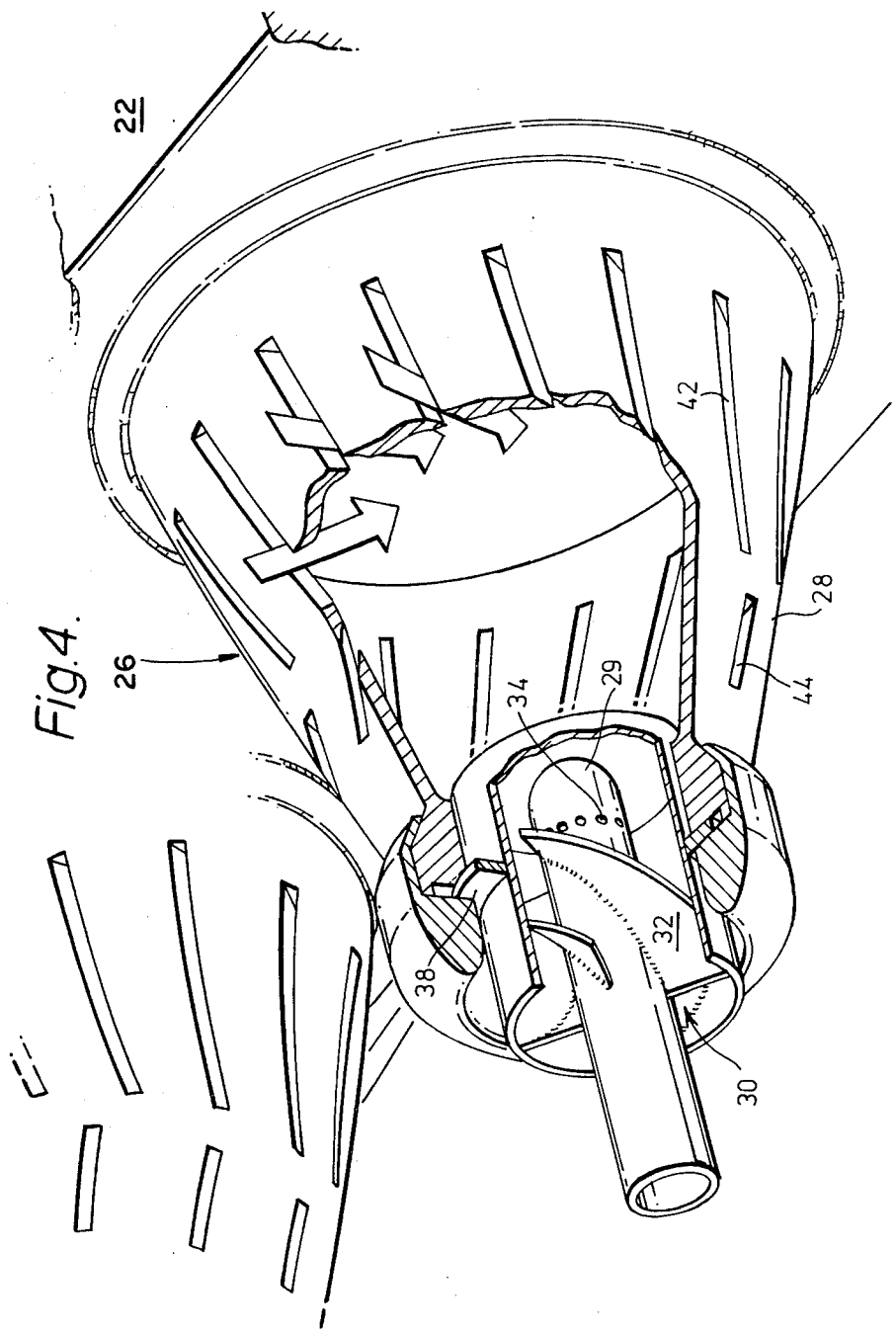

In FIG. 4 there is illustrated the burner 26 with a conical member 28 having two sets of slots 42 and 44, and these slots are arranged tangentially to the conical members, but to produce opposed rotation within the conical member. In this embodiment, the primary zone flow structure entering the flame tube 22 is modified by the reduction in the net angular momentum of the conical member efflux. The recirculation of the mixture may be destroyed altogether without extinguishing the flame because of the extremely high turbulence produced. This enables the design of a well mixed flame tube primary zone with low mean residence time to be achieved with a consequent reduction in the formation of oxides of nitrogen. It is not usually possible to achieve core burning at lean mixtures with this embodiment and the sleeve 31 does not protrude within the interior of the conical member 28.

Figure 6:
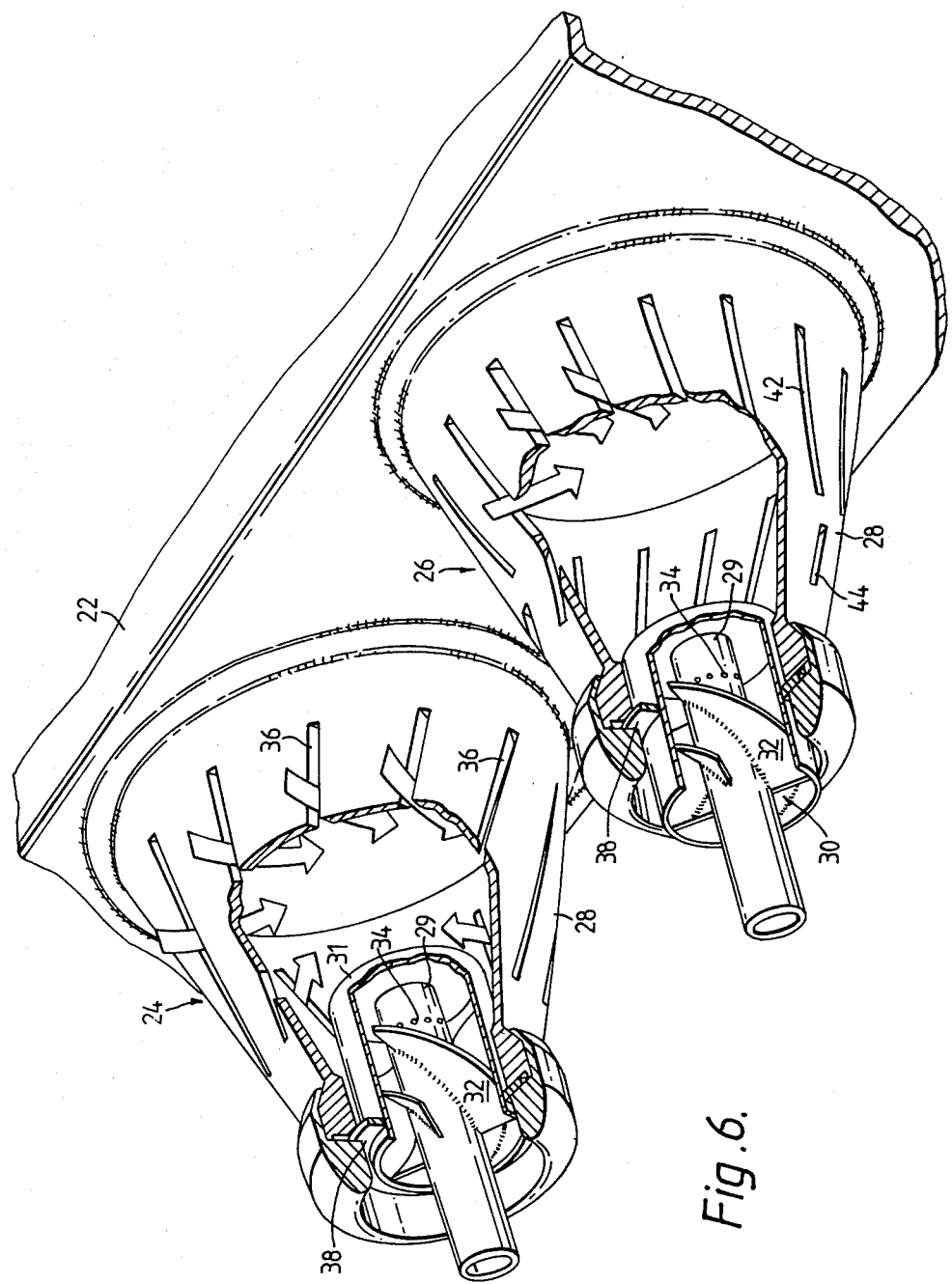
FIG. 6 is a perspective view of a portion of the combustion apparatus utilizing fuel burners of the type shown in FIGS. 2 or 3 in combination with fuel burners of the type shown in FIG. 4.

A combination of a set of burners 24 as illustrated in FIGS. 2 and 3 and a set of burners 26 as illustrated in FIG. 4 is shown in FIG. 6 enables a staged combustion system to be employed in which the first type of burner provides for combustion at lower power and the second type for combustion at high power conditions of the engine with consequent reduction in emissions of hydrocarbons and oxides of nitrogen.

Various modifications may be made to the combustion apparatus without departing from the scope of the invention. For example the slots and holes illustrated in the Figures could be replaced by orifices of any suitable shape.

The invention is also suitable for combustion equipment consisting of a plurality of separate circumferentially arranged flame tubes.

Figure 5:
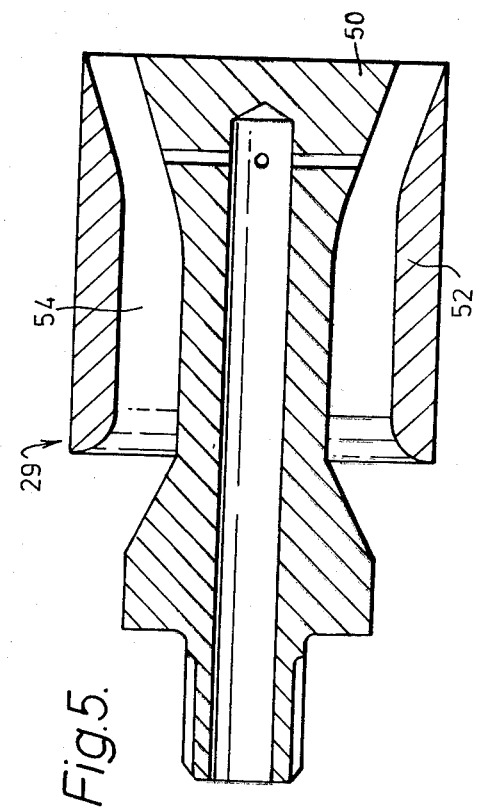
FIG. 5 is a cross-sectional view of an alternative type of fuel injector.

In FIG. 5 there is illustrated an alternative type of fuel injector 29 to the one illustrated in FIGS. 1 to 4. The diameter of the body 50 of the fuel injector 29 gradually increases towards its downstream end, and the body 50 is surrounded by a sleeve 52 whose internal diameter also gradually increases towards its downstream end. The annular air passage 54 between the body 50 and the sleeve 52 is thus conical and slightly convergent. The body 50 and the sleeve 52 are connected by axial vanes 54.

This design permits a more evenly distributed flow of fuel/air mixture into the conical member 28 than the swirler 29 used in the other embodiments, producing a cone of mixture whose direction can be carefully controlled.

We claim:

1. Combustion apparatus for a gas turbine engine comprising:
   an annular flame tube having an upstream end and a downstream end and a primary zone adjacent the upstream end thereof;
   a plurality of circumferentially spaced hollow frusto-conical members secured to the upstream end of said flame tube and in communication with the interior thereof, each said frusto-conical member being open at each end, each said frusto-conical member having a plurality of orifices formed in the wall thereof for passage of air therethrough tangentially into said frusto-conical member to impart a swirl within the same; and
   an air inlet and fuel injection means positioned adjacent the narrower end of each of said frusto-conical members, said air inlet and fuel injecting means comprising a sleeve and a central fuel duct terminating in at least one nozzle, said sleeve and said fuel duct extending into the interior of said frusto-conical member, and a plurality of air swirling vanes positioned between said fuel duct and said sleeve, said air swirling vanes being arranged to impart a swirl to air from said air inlet and fuel from said nozzle in an opposite direction to the swirl of air caused by air entering through said orifices in said frusto-conical member to promote a mixing of fuel and air and a degree of swirl to the fuel and air mixture entering the primary zone of said flame tube while discouraging fuel from adhering to an interior surface of the wall of said frusto-conical member by a delay of the spread of fuel from the core of fuel and air issuing from the air inlet and fuel injecting means, thereby maintaining a relatively rich fuel and air mixture in the core and stability in burning in the primary zone of said flame tube over a complete power range of the gas turbine engine.

2. Combustion apparatus as claimed in claim 1 in which said sleeve and said fuel duct extend into the interior of said frusto-conical member to an extent approximately one-half the diameter of said sleeve.

3. Combustion apparatus as claimed in claim 1 in which said fuel duct includes a plurality of radially directed nozzles positioned immediately downstream of said air swirling vanes for directing fuel across the swirl of air from said air swirling vanes.

4. Combustion apparatus as claimed in claim 1 including a seal between said sleeve and said frusto-conical member, said seal permitting relative movement between said sleeve and said frusto-conical member.

5. Combustion apparatus as claimed in claim 1 in which said orifices are elongated slots.

6. Combustion apparatus as claimed in claim 1 in which said orifices are a plurality of holes having an angular pitch between 18° and 30°.

7. Combustion apparatus for a gas turbine engine comprising:
   an annular flame tube having an upstream end, a downstream end and a primary zone adjacent the upstream end;
   a plurality of first burner means in communication with the upstream end of said flame tube for supplying a fuel and air mixture into the primary zone of said flame tube, each of said first burner means including an air inlet and fuel injector means, each having a capability of stable burning over a complete power range of the gas turbine engine; and a plurality of second burner means in communication with said annular flame tube for supplying a fuel and air mixture to the primary zone of the flame tube with a reduced residence time within said primary zone to reduce formation of oxides of nitrogen and thereby emissions from the gas turbine engine, each of said second burner means including a hollow frusto-conical member, said frusto-conical member being open at each end thereof and having the larger end attached to said flame tube and in communication with the interior thereof and an air inlet and fuel injecting means adjacent the narrower end of said frusto-conical member, said air inlet and fuel injecting means including a sleeve carried in the smaller end of said frusto-conical member and a central fuel duct terminating in at least one fuel nozzle, and a plurality of air swirling vanes located between said sleeve and said fuel duct for imparting a swirl to the air and the fuel issuing from the at least one fuel nozzle, and said frusto-conical member having at least two sets of orifices formed in the wall thereof, one set of orifices inducing a swirl in the same direction as the swirl imparted by said air swirling vanes and the other set of orifices inducing a swirl in the opposite direction to produce a highly turbulent flow within the frusto-conical member to adequately mix the fuel and air therein and reduce the net angular momentum of the mixture flow from each of said second burner means into the primary zone of said flame tube.

8. Combustion apparatus as claimed in claim 7 in which each of said air inlet and fuel injector means in each of said first burner means further includes a hollow frusto-conical member for each of said air inlet and fuel injector means, said last mentioned frusto-conical member being open at each end thereof and having the larger end attached to said flame tube and in communication with the interior thereof and the air inlet and fuel injection means positioned adjacent the narrower end thereof, said last mentioned frusto-conical member having a plurality of orifices formed in the wall thereof for the passage of air therethrough tangentially into said frusto-conical member to impart a swirl within the same, said air inlet and fuel injector means for said first burner comprising a sleeve and a central fuel duct terminating in at least one nozzle, said sleeve and said fuel duct extending into the interior of the frusto-conical member of said first burner means, and a plurality of air swirling vanes positioned between said fuel duct and said sleeve, said air swirling vanes being arranged to impart a swirl to air from said air inlet and fuel from said nozzle in an opposite direction to the swirl of air caused by air entering through the orifices in said frusto-conical member of said first burner means to promote a mixing of fuel and air and a degree of swirl to the fuel and air mixture entering the primary zone of the flame tube from said first burner means while discouraging fuel from adhering to an interior surface of the wall of said frusto-conical member of said first burner means by a delay of the spread of fuel from the core of fuel and air issuing from the air inlet and fuel injection means, thereby maintaining a relatively rich fuel and air mixture in the core and stability in burning in the primary zone of said flame tube over a complete power range in the core entering the primary zone.

9. Combustion apparatus as claimed in claim 8 in which said sleeve and said fuel duct of said first burner means extend into the interior of the frusto-conical member of said first burner means to an extent of approximately one-half the diameter of said sleeve.

10. Combustion apparatus as claimed in claim 7 in which said fuel duct in said frusto-conical member of said first burner means terminates in a plurality of radially directed nozzles positioned immediately downstream of said air swirling means for directing fuel across air flow swirled therefrom.

11. Combustion apparatus as claimed in claim 7 including a seal provided between said sleeve and said frusto-conical member of each of said first burner means for allowing relative movement therebetween.

12. Combustion apparatus as claimed in claim 7 in which said orifices in said frusto-conical member of said first burner means are elongated slots.

13. Combustion apparatus as claimed in claim 7 in which said orifices in said frusto-conical member of said first burner means are a plurality of holes having an angular pitch of between 18° and 30°.

* * * * *